(12) United States Patent
Yoon (10) Patent No.: US 8,966,627 B2
(45) Date of Patent: Feb. 24, 2015

(54) METHOD AND APPARATUS FOR DEFENDING DISTRIBUTED DENIAL-OF-SERVICE (DDOS) ATTACK THROUGH ABNORMALLY TERMINATED SESSION

(75) Inventor: Seung Yong Yoon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 35 days.

(21) Appl. No.: 13/612,749

(22) Filed: Sep. 12, 2012

(65) Prior Publication Data

US 2013/0074183 A1    Mar. 21, 2013

(30) Foreign Application Priority Data

Sep. 16, 2011    (KR) .......................... 10-2011-0093618

(51) Int. Cl.
  *G06F 21/00*    (2013.01)
  *H04L 29/06*    (2006.01)
(52) U.S. Cl.
  CPC ............ *G06F 21/00* (2013.01); *H04L 63/0254* (2013.01); *H04L 63/166* (2013.01); *H04L 63/1458* (2013.01)
  USPC .................................. 726/22; 726/14; 726/13
(58) Field of Classification Search
  CPC .............. H04L 63/1458; H04L 63/166; H04L 63/0254
  USPC .................................................. 726/13–14, 22
  See application file for complete search history.

(56) References Cited

U.S. PATENT DOCUMENTS

| | | | | |
|---|---|---|---|---|
| 5,958,053 | A | * | 9/1999 | Denker .............................. 726/1 |
| 6,052,785 | A | * | 4/2000 | Lin et al. ............................ 726/5 |
| 6,219,706 | B1 | * | 4/2001 | Fan et al. ....................... 709/225 |
| 6,298,063 | B1 | * | 10/2001 | Coile et al. .................... 370/401 |
| 2003/0105976 | A1 | * | 6/2003 | Copeland, III ................ 713/201 |
| 2003/0110394 | A1 | * | 6/2003 | Sharp et al. ................... 713/200 |

(Continued)

FOREIGN PATENT DOCUMENTS

KR    10-2011-0054537    5/2011

OTHER PUBLICATIONS

Haining Wang; Danlu Zhang; Shin, K.G., "Detecting SYN flooding attacks," INFOCOM 2002. Twenty-First Annual Joint Conference of the IEEE Computer and Communications Societies. Proceedings. IEEE , vol. 3, No., pp. 1530,1539, Jun. 23-22, 2002.*

(Continued)

*Primary Examiner* — Jung Kim
*Assistant Examiner* — Theodore Parsons (57) ABSTRACT

There are provided a method and apparatus for defending a Distributed Denial-of-Service (DDoS) attack through abnormally terminated sessions. The DDoS attack defending apparatus includes: a session tracing unit configured to parse collected packets, to extract header information from the collected packets, to trace one or more abnormally terminated sessions corresponding to one of pre-defined abnormally terminated session cases, based on the header information, and then to count the number of the abnormally terminated sessions; and an attack detector configured to compare the number of the abnormally terminated sessions to a predetermined threshold value, and to determine whether a DDoS attack has occurred, according to the results of the comparison. Therefore, it is possible to significantly reduce a false-positive rate of detection of a DDoS attack and the amount of computation for detection of a DDoS attack.

14 Claims, 8 Drawing Sheets

(56) References Cited

U.S. PATENT DOCUMENTS

| | | | |
|---|---|---|---|
| 2005/0039104 A1* | 2/2005 | Shah et al. | 714/776 |
| 2005/0141508 A1* | 6/2005 | Ogawa | 370/394 |
| 2005/0210533 A1* | 9/2005 | Copeland et al. | 726/23 |
| 2005/0213504 A1* | 9/2005 | Enomoto et al. | 370/235 |
| 2005/0278779 A1* | 12/2005 | Koppol et al. | 726/22 |
| 2006/0028999 A1* | 2/2006 | Iakobashvili et al. | 370/252 |
| 2007/0115850 A1* | 5/2007 | Tsuchiya et al. | 370/252 |
| 2008/0028467 A1* | 1/2008 | Kommareddy et al. | 726/23 |
| 2011/0064093 A1* | 3/2011 | Mattson et al. | 370/474 |
| 2011/0131646 A1* | 6/2011 | Park et al. | 726/13 |
| 2012/0117646 A1* | 5/2012 | Yoon et al. | 726/22 |
| 2013/0042322 A1* | 2/2013 | Yoon | 726/23 |

OTHER PUBLICATIONS

Haris, S. H C; Ahmad, R.B.; Ghani, M. A H A, "Detecting TCP SYN Flood Attack Based on Anomaly Detection," Network Applications Protocols and Services (NETAPPS), 2010 Second International Conference on , vol., No., pp. 240,244, Sep. 22-23, 2010.*

Gang Shen; Dalong Chen; Zhongping Qin, "Anomaly Detection Based on Aggregated Network Behavior Metrics," Wireless Communications, Networking and Mobile Computing, 2007. WiCom 2007. International Conference on , vol., No., pp. 2210,2213, Sep. 21-25, 2007.*

Yi Xie et al., "Monitoring the Application-Layer DDoS Attacks for Popular Websites", IEEE/ACM Transactions on Networking, Feb. 2009, pp. 15-25, vol. 17, No. 1.

* cited by examiner

METHOD AND APPARATUS FOR DEFENDING DISTRIBUTED DENIAL-OF-SERVICE (DDOS) ATTACK THROUGH ABNORMALLY TERMINATED SESSION

CLAIM FOR PRIORITY

This application claims priority to Korean Patent Application No. 10-2011-0093618 filed on Sep. 16, 2011 in the Korean Intellectual Property Office (KIPO), the entire contents of which are hereby incorporated by reference.

BACKGROUND

1. Technical Field

An example embodiment of the present invention relates in general to technology for defending Distributed Denial-of-Service (DDoS) attacks, and more specifically, to a method and apparatus for defending DDoS attacks through abnormally terminated sessions, capable of detecting and responding with TCP-based DDoS attacks.

2. Related Art

A Distributed Denial of Service ("DDoS") attack is a DoS attack in which a plurality of unspecific attackers transmit a large amount of data to a target server for the purpose of disrupting service provided by the server to sharply deteriorate the performance of the corresponding network or server, thereby disabling users from using the service provided by the server.

DDoS attacks are greatly classified into network layer attacks and application layer attacks. Network layer attacks include TCP Flooding, UDP Flooding, ICMP Flooding, ICMP Flooding, etc., and application layer attacks include HTTP Get Flooding, SIP Flooding, DNS Flooding, etc.

Conventional DDoS attacks could be easily detected and defended by a statistical method based on traffic volume since they generated a large amount of abnormal traffic using spoofed IP thereby exhausting the available bandwidth of a network or resources of a server.

However, DDoS attacks have evolved to attempts of establishing a TCP connection using correct IP without using spoofed IP and then making attacks. Accordingly, it is difficult to distinguish attack traffic from normal traffic, and also it is impossible to detect such attacks using either a behavior-based method or a statistical method. A representative example of the attacks is TCP Connection Flooding.

TCP Connection Flooding is an attack to add load to a server by establishing a TCP session and then transmitting a FIN (finish) packet or a Reset packet directly without transmitting any data packets to terminate the TCP session. That is, in normal operation, a TCP session is established, data is transmitted, and then the session terminates, but, in the case of TCP Connection Flooding, a TCP session is established and directly terminates without data transfer. TCP Connection Flooding may be called CPS Flooding since it adds connections per second (CPS) to a server.

Most DDoS attack detectors for detecting TCP Connection Flooding have a high false-positive rate since they use a method of counting the number of SYN packets that request session connections, and detecting occurrence of a DDoS attack if the count value of the SYN packets exceeds a predetermined threshold value.

The TCP Connection Flooding described above is a representative TCP-based DDoS attack of a network layer, and HTTP Get Flooding is a representative DDoS attack of an application layer. HTTP Get Flooding is an attempt of establishing a TCP session and then transmitting a large amount of HTTP Get Request messages to a server to add load to resources of the server, thereby disabling the server from providing service.

A conventional method of detecting HTTP Get Flooding is to count the number of HTTP Get Request packets and determine, if the count value exceeds a predetermined threshold value, that a DDoS attack has occurred. However, the conventional method also has a high false-positive rate of detection of DDoS attacks. Other than the conventional method, many methods for detecting HTTP Get Flooding have been proposed. For example, there are a method of tracing the history of source IPs transmitting HTTP Get Request messages to a specific Unique Resource Identifier (URI) to detect an attack, a method of analyzing a distribution of hits to the URI page of a server, a method in which a server analyzes a distribution of times at which HTTP Get Request messages have been received to detect an attack, a method of tracing the state of an application layer to detect an attack, etc.

However, the above-described methods require a large amount of computation since they analyze data (that is, payloads of packets) of an application layer to seek Get strings and trace connection states in the application layer or process analysis for each flow (for example, for each URI) in the application layer.

Korean Laid-open Patent Application No. 2011-0054537 (entitled "Apparatus for Detecting and Filtering DDoS Attack Based on Distribution") discloses a technique in which the reception times of HTTP requests are measured for a predetermined time period to produce a distribution of differences between the reception times of the HTTP requests, and the distribution of the reception time differences is compared to pre-stored normal traffic distribution information to detect a DDoS attack according to the results of the comparison in order to defend HTTP Get Flooding among application layer DDoS attacks.

However, Korean Laid-open Patent Application No. 2011-0054537 may detect a case where a large amount of HTTP requests are generated in a server due to a specific event, as an DDoS attack, since a DDoS attack is determined based on the reception times of HTTP requests. Also, Korean Laid-open Patent Application No. 2011-0054537 can detect only application layer attacks.

SUMMARY

Accordingly, example embodiments of the present invention are provided to substantially obviate one or more problems due to limitations and disadvantages of the related art.

An example embodiment of the present invention provides an apparatus for defending Distributed Denial-of-Service (DDoS) attacks through abnormally terminated sessions, and capable of significantly reducing a false-positive rate of detection of DDoS attacks and the amount of computation for detection of DDoS attacks.

Another example embodiment of the present invention also provides a method for defending Distributed Denial-of-Service (DDoS) attacks through abnormally terminated sessions, and capable of significantly reducing a false-positive rate of detection of DDoS attacks and the amount of computation for detection of DDoS attacks.

In an example embodiment, there is provided an apparatus for defending a Distributed Denial-of-Service (DDoS) attack, including: a session tracing unit configured to parse collected packets, to extract header information from the collected packets, to trace one or more abnormally terminated sessions corresponding to one of pre-defined abnormally terminated session cases, based on the header information, and then to count the number of the abnormally terminated sessions; and an attack detector configured to compare the number of the abnormally terminated sessions to a predetermined threshold value, and to determine whether a DDoS attack has occurred, according to the results of the comparison.

The session tracing unit may extract the header information and TCP flags information from the collected packets, the header information including at least one piece of information about a protocol, a source IP, a source port, a destination IP, and a destination port.

The session tracing unit may manage a session table for tracing a state of a session using the extracted header information, and a flow table for storing the number of abnormally terminated sessions corresponding to one of the pre-defined abnormally terminated session cases, according to the results of tracing the state of the session, and the apparatus may further include a storage unit in which the session table and the flow table are stored.

The pre-defined abnormally terminated session cases may include at least one of a case where a client transmits a Reset packet to a server to terminate a session as soon as the client receives a SYN/ACK packet from the server, a case where a client transmits a FIN packet to a server to terminate a session without data transfer after a TCP session connection between the client and the server is established, a case where a client transmits a Reset packet to a server to terminate a session without data transfer after a TCP session connection between the client and the server is established, and a case where a client transmits a FIN packet to a server and then transmits a Reset packet to the server to terminate a session after a TCP session connection between the client and the server is established and data is completely transmitted between the client and the server.

The attack detector may compare the number of abnormally terminated sessions counted with respect to each of the pre-defined abnormally terminated session cases, to the predetermined threshold value, and determine, if the number of abnormally terminated sessions counted with respect to the pre-defined terminated session case exceeds the predetermined threshold value, that a DDoS attack has occurred.

If a DDoS attack is detected, the attack detector may create attack detection information or an alarm message and transmit the attack detection information or the alarm message to the apparatus according to a predetermined method, and the attack detection information may include at least one piece of information about a protocol, a source IP, a destination port, and a destination IP of a corresponding client.

The apparatus may further include an attack defender configured to register the at least one piece of information about the protocol, the source IP, the destination port, and the destination IP of the corresponding client in an access control list, and to block packets transmitted from the corresponding client.

In another example embodiment, there is provided a method for defending a Distributed Denial-of-Service (DDoS) attack, including: parsing collected packets to extract header information from the collected packets; tracing one or more abnormally terminated sessions corresponding to one of pre-defined abnormally terminated session cases, based on the header information, and counting the number of the abnormally terminated sessions; and comparing the number of the abnormally terminated sessions to a predetermined threshold value, and determining whether a DDoS attack has occurred, according to the results of the comparison.

The pre-defined abnormally terminated session cases include at least one of a case where a client transmits a Reset packet to a server to terminate a session as soon as the client receives a SYN/ACK packet from the server, a case where a client transmits a FIN packet to a server to terminate a session without data transfer after a TCP session connection between the client and the server is established, a case where a client transmits a Reset packet to a server to terminate a session without data transfer after a TCP session connection between the client and the server is established, and a case where a client transmits a FIN packet to a server and then transmits a Reset packet to the server to terminate a session after a TCP session connection between the client and the server is established and data is completely transmitted between the client and the server.

According to the method and apparatus for defending a DDoS attack through abnormally terminated sessions, packets on a network are collected, the collected packets are parsed to extract header information from the collected packets, the extracted header information is managed through a session table and a flow table, the state of a session is traced to count the number of abnormally terminated sessions corresponding to at least one of pre-defined abnormally terminated session cases, and the count value is compared to a predetermined threshold value, thereby detecting a DDoS attack. Also, if a DDoS attack is detected, 4-Tuple information of the extracted header information is registered in the ALC to block all packets transmitted from the corresponding client.

Accordingly, since attacks are detected based on abnormally terminated sessions that are important characteristics appearing in TCP-based DDoS attacks, it is possible to detect HTTP Get Flooding of an application layer as well as TCP Connection Flooding of a network layer.

Also, since attacks are detected based on abnormally terminated sessions, DDoS attacks can be detected through a simple method, and accordingly, the DDoS attack defending apparatus may be softwarily configured or may be implemented as hardware logic. Furthermore, it is possible to maintain a false-positive rate of detection of DDoS attacks at nearly 0%.

Also, since all processing is performed in a network layer that is a lower layer of an application layer, it is possible to significantly reduce the amount of computation for detection of attacks.

In addition, it is possible to correctly detect and respond with new DDoS attacks of adding load to a server through repeated session connections and terminations.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Example embodiments of the present invention are described below in sufficient detail to enable those of ordinary skill in the art to embody and practice the present invention. It is important to understand that the present invention may be embodied in many alternate forms and should not be construed as limited to the example embodiments set forth herein.

The terminology used herein to describe embodiments of the invention is not intended to limit the scope of the invention. The articles "a," "an," and "the" are singular in that they have a single referent, however the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art to which this invention belongs. It will be further understood that terms in common usage should also be interpreted as is customary in the relevant art and not in an idealized or overly formal sense unless expressly so defined herein.

Hereinafter, the example embodiments of the present invention will be described in detail with reference to the appended drawings. In the following description, for easy understanding, like numbers refer to like elements throughout the description of the figures, and the same elements will not be described further.

A method and apparatus for defending a Distributed Denial-of-Service (DDoS) attack through abnormally terminated sessions, according to embodiments of the present invention, are aimed at defending TCP-based DDoS attacks, wherein the TCP-based DDoS attacks include network layer TCP Flooding and application layer attacks (for example, HTTP Get Flooding) that operate in the upper layer of the TCP layer.

Also, the method of defending a DDoS attack through abnormally terminated sessions traces abnormally terminated sessions in order to detect TCP-based DDoS attacks. Hereinafter, before abnormally terminated sessions are defined, normally terminated sessions will be first described.

FIGS. 1 through 4 are flowcharts illustrating normal session termination operations that are performed between a client and a server.

Figure 1:
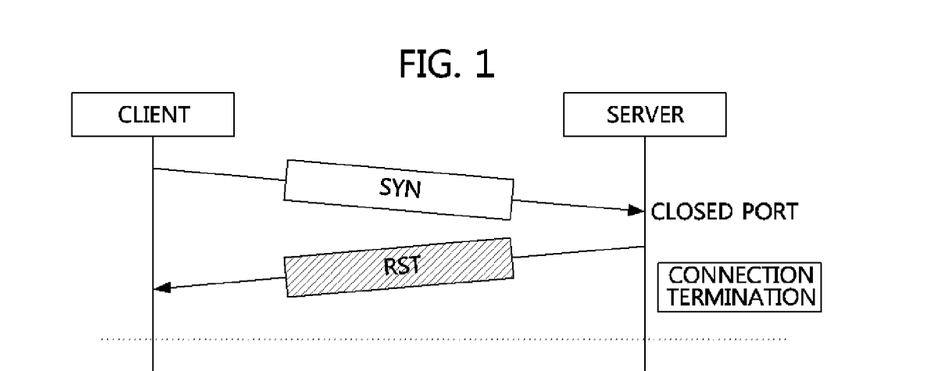
FIGS. 1 through 4 are flowcharts illustrating normal session termination operations that are performed between a client and a server.

The first normal session termination operation corresponds, as shown in FIG. 1, to a case where when a client sends a SYN packet to a closed port of a server in order to request the server to connect a session to the client, the server transmits a Reset (RST) packet to the client, thereby normally terminating the session.

Figure 2:
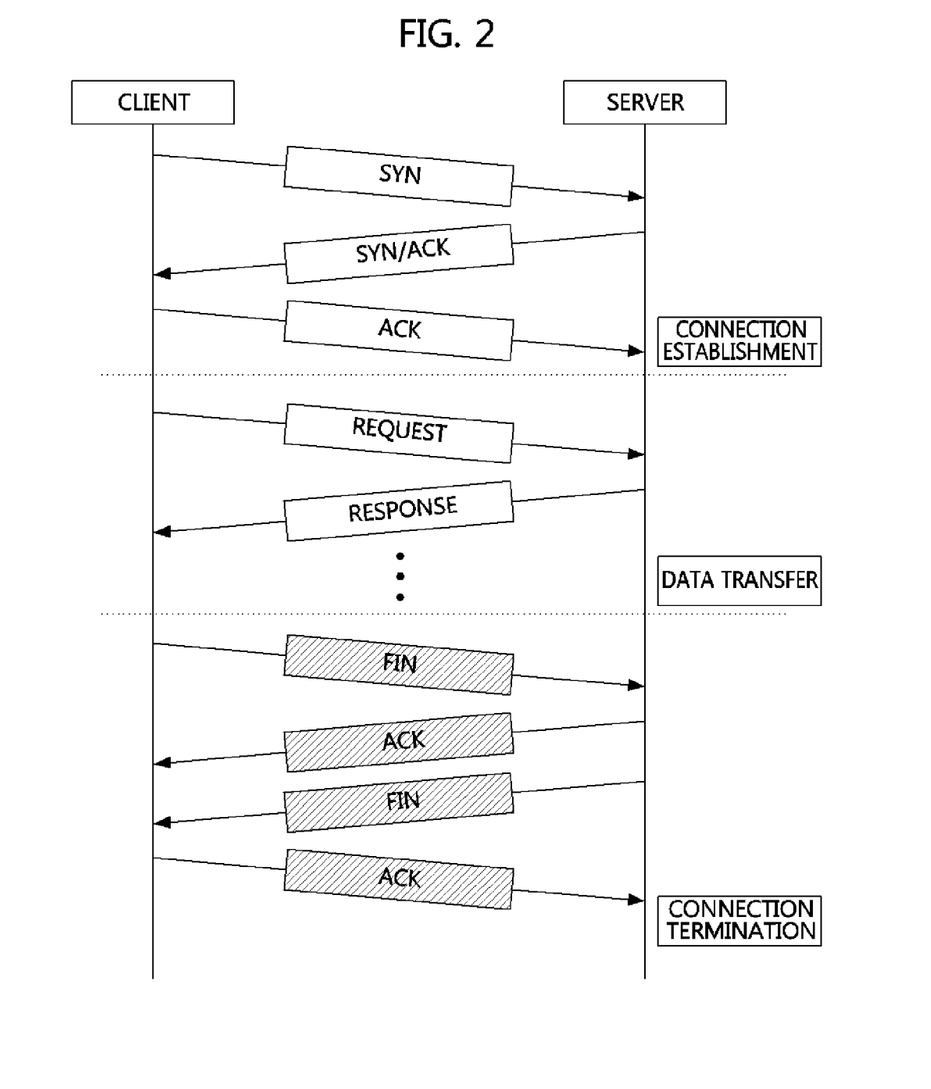

The second normal session termination operation corresponds, as shown in FIG. 2, to a case where a client transmits a SYN packet to a server, the server transmits a SYN/ACK packet to the client in response to the SYN packet, the client transmits an ACK packet to the server to establish a session connection between the client and the server, then data is transmitted between the client and the server, the client transmits, after the data transfer is complete, a FIN packet to the server, the server transmits an ACK packet to the client in response to the FIN packet and then transmits a FIN packet to the client, and the client transmits an ACK packet to the server in response to the FIN packet, thereby normally terminating the session. The session termination case shown in FIG. 2 is a general case of normally terminating a session through TCP 4-Way Handshaking. That is, the case where a server transmits a FIN packet to a client to terminate a session corresponds to normal session termination.

Figure 3:
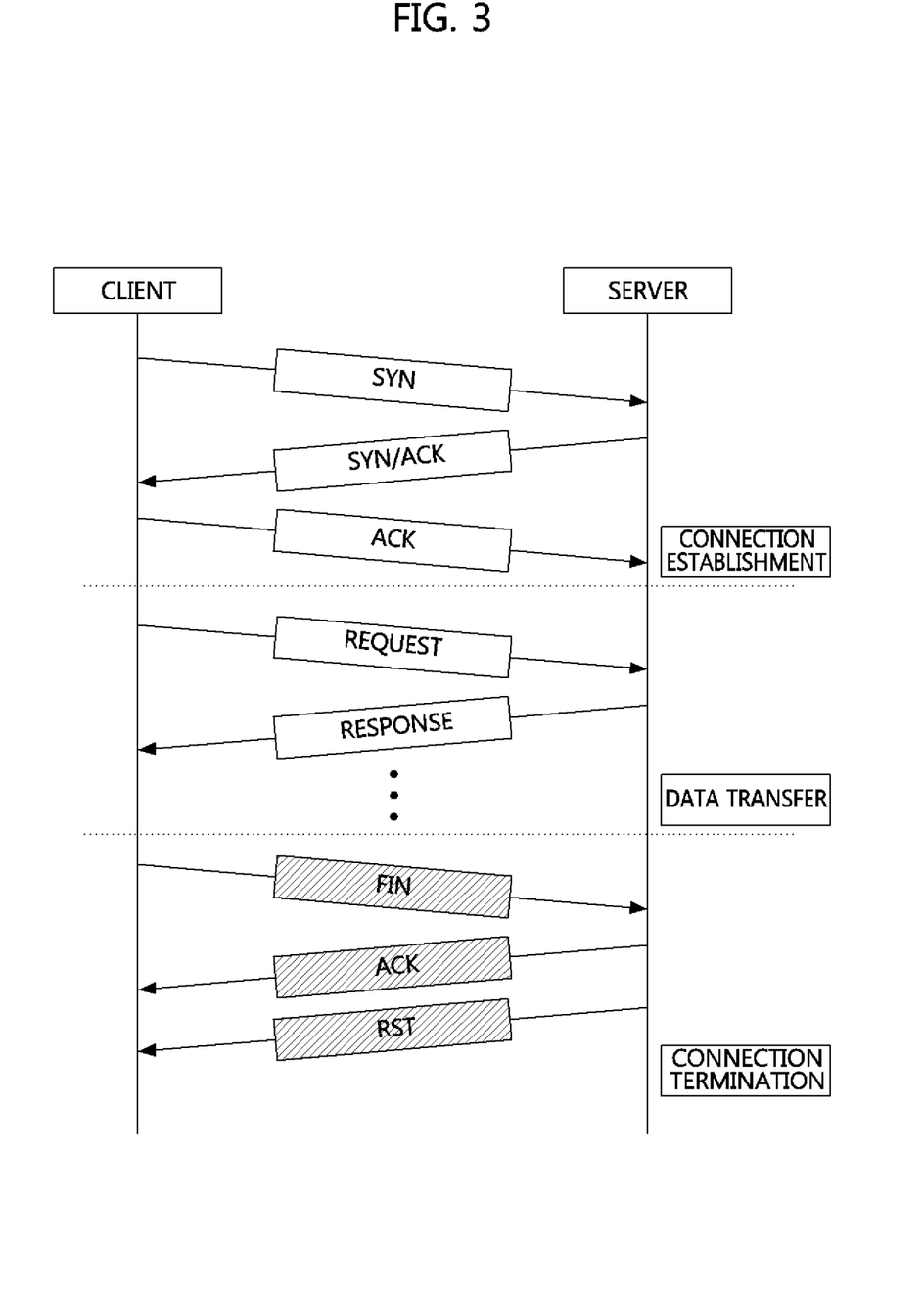
Figure 4:
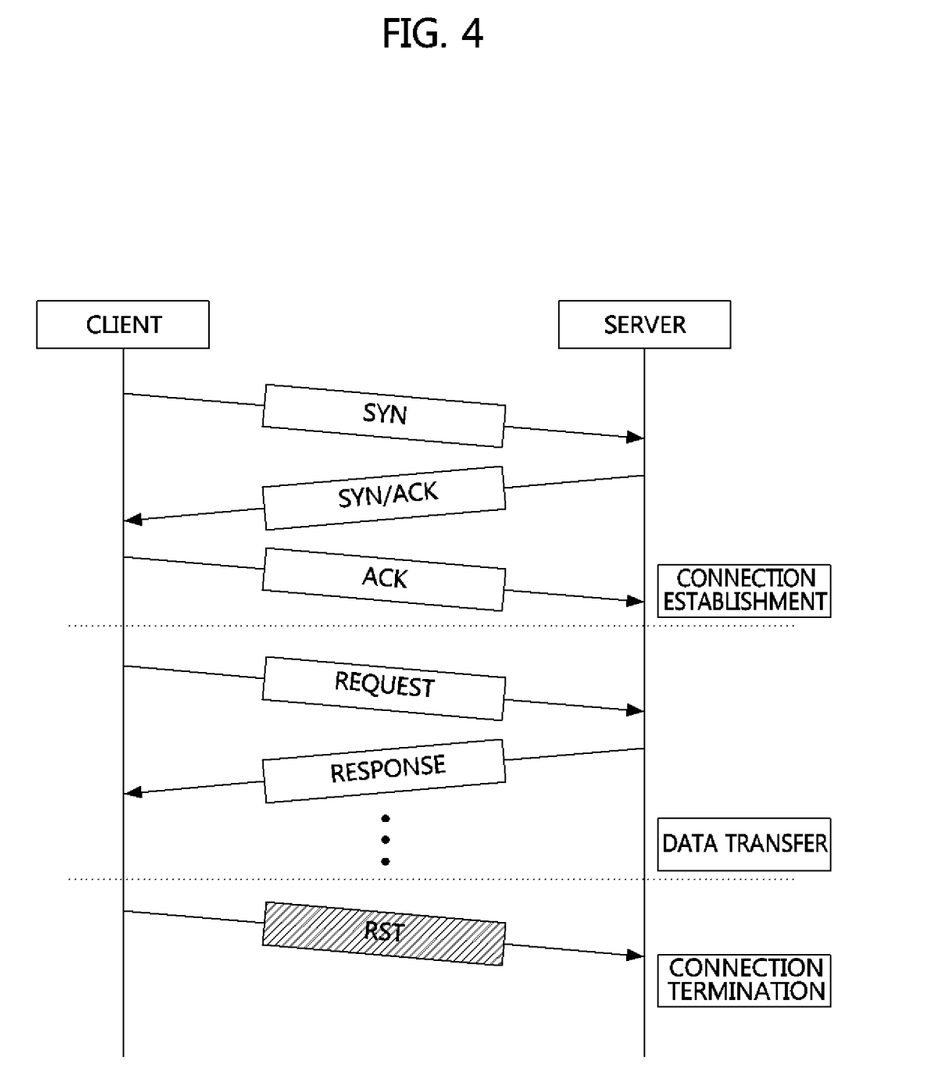

The third normal session termination operation corresponds, as shown in FIG. 3, to a case where a session connection between a server and a client is established, data is transmitted between the server and the client, then, the client transmits a FIN packet to the server, and the server transmits an ACK packet to the client in response to the FIN packet and then transmits a Reset (RST) packet to the client, thereby normally terminating the session. The fourth normal session termination operation corresponds, as shown in FIG. 3, to a case where a session connection is established between a server and a client, data is transmitted between the server and the client, and then the client transmits a Reset (RST) packet to the server, thereby terminating the session.

Meanwhile, a method of defending a DDoS attack through abnormally terminated sessions, according to an embodiment of the present invention, monitors abnormally terminated sessions between a client and a server in order to detect a TCP-based DDoS attack. Hereinafter, abnormally terminated sessions that are monitored by the DDoS attack defending method will be defined with reference to FIGS. 5 through 8.

Figure 5:
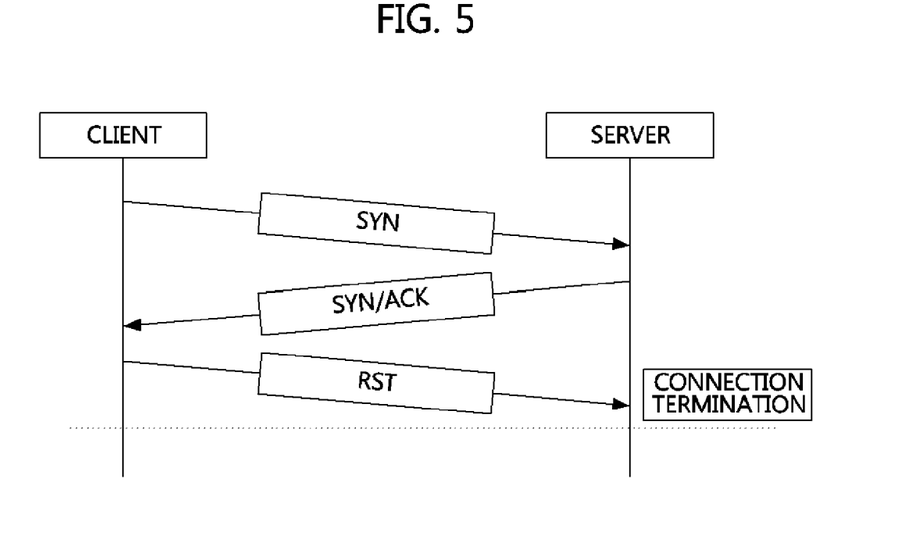
FIG. 5 is a flowchart illustrating a first abnormal session termination case that is monitored by a Distributed Denial-of-Service (DDoS) attack defending method according to an embodiment of the present invention.

FIG. 5 is a flowchart illustrating a first abnormally terminated session case that is monitored by the DDoS attack defending method.

Referring to FIG. 5, the first abnormally terminated session case corresponds to a case where as soon as a client receives a SYN/ACK packet from a server, the client transmits a Reset Packet to the server to thus terminate a session.

In a normal session connection, a client transmits a SYN packet to a server to request the server to establish a TCP session connection to the client, the server transmits a SYN/ACK packet to the client in response to the SYN packet, and then, the client transmits an ACK packet to the server to perform TCP 3-Way Handshaking, thereby completing session connection establishment. However, if the client is a zombie computer attempting a DDoS attack, the client transmits, after receiving a SYN/ACK packet from the server, a Reset packet to the server, instead of transmitting an ACK packet for establishing a session connection, to abnormally terminate the session.

That is, the case where a client that has requested a session connection transmits a Reset packet to a server that has accepted the connection request, without any specific reason, can be determined as an abnormal case.

Meanwhile, Half-Open Scan is similar to the first abnormally terminated session shown in FIG. 5, however, the Half-Open Scan is different from DDoS attacks in that a destination port varies in the Half-Open Scan, whereas traffic used for a DDoS attack has a fixed destination port. The results of analysis on the DDoS attack which occurred on Jul. 7, 2009, showed abnormally terminated session traffic as shown in FIG. 5.

Figure 6:
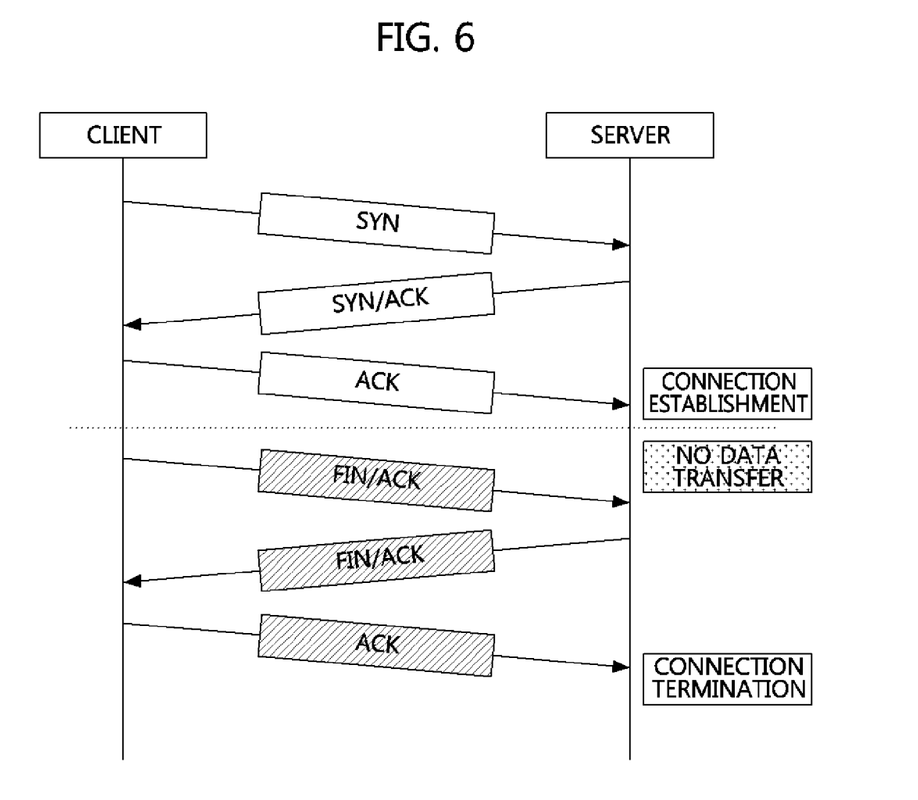
FIG. 6 is a flowchart illustrating a second abnormal session termination case that is monitored by the DDoS attack defending method.

FIG. 6 is a flowchart illustrating a second abnormally terminated session case that is monitored by the DDoS attack defending method.

Referring to FIG. 6, the second abnormally terminated session case corresponds to a case where after a TCP session connection between a client and a server is established, and then the client transmits a FIN packet to the server, without transmitting any data between the client and the server, to thereby terminate the session.

Generally, if TCP session connection establishment between a client and a server is complete through TCP 3-Way Handshaking, the client transmits a data request message to the server, and receives a response to the data request message from the server. A representative data request message is an HTTP Get Request message. However, if the client is a zombie computer attempting a DDoS attack, the client transmits, just after session connection establishment, a FIN packet to the server to add load to the resources of the server, thereby terminating the corresponding session.

That is, the case where after a session connection between a client and a server is established, the client that has requested the session connection terminates the session without data transfer between the client and the server, can be determined as an abnormal case. The attack is called CPS Flooding since connections per second (CPS) increase. "TCP Multi-Connect" which corresponds to the menu No. 6 of Netbot Attacker being a DDoS attack tool uses the abnormally terminated session traffic.

Figure 7:
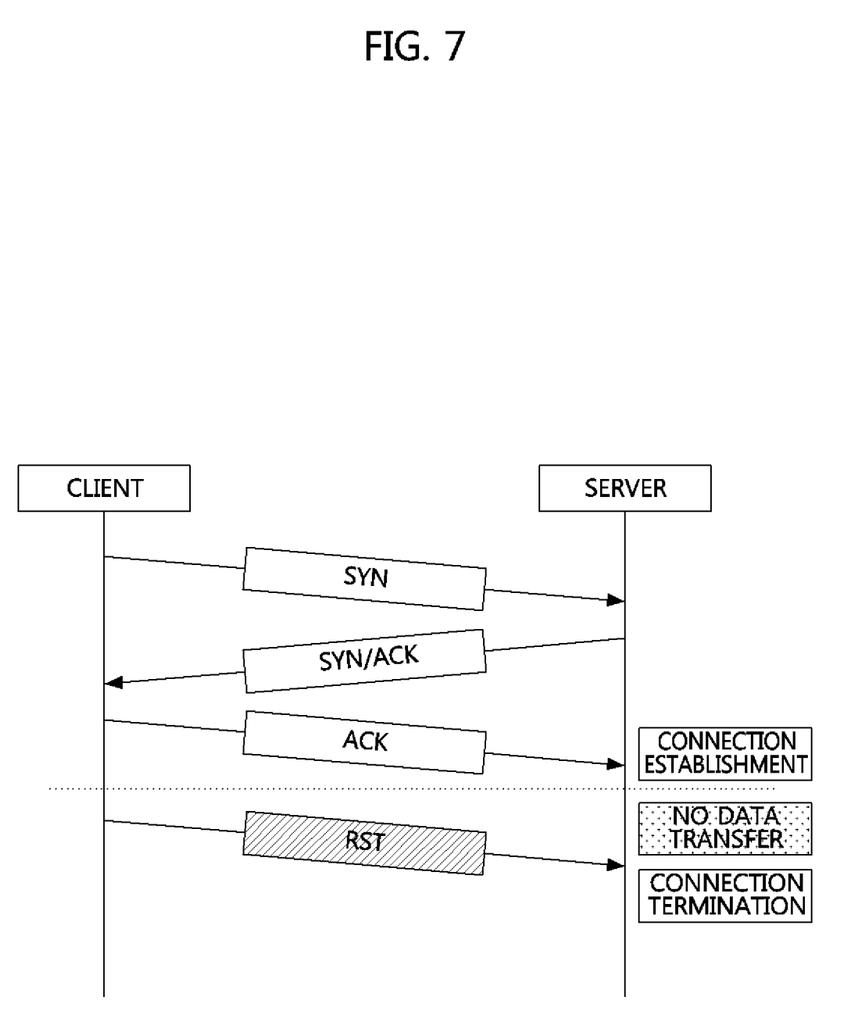
FIG. 7 is a flowchart illustrating a third abnormal session termination case that is monitored by the DDoS attack defending method.

FIG. 7 is a flowchart illustrating a third abnormally terminated session case that is monitored by the DDoS attack defending method.

Referring to FIG. 7, the third abnormally terminated session case corresponds to a case where a TCP session connection between a client and a server is established, and then the client transmits a Reset (RST) packet to the server without data transfer to thereby terminate the session.

The third abnormally terminated session case is similar to the second abnormally terminated session case. That is, after a TCP session connection between a client and a server is established, the client that has requested the session connection transmits a Reset packet to the server without data transfer in order to terminate the session. Here, the Reset packet, unlike the FIN packet, terminates the session without performing Handshaking between the client and the server.

Figure 8:
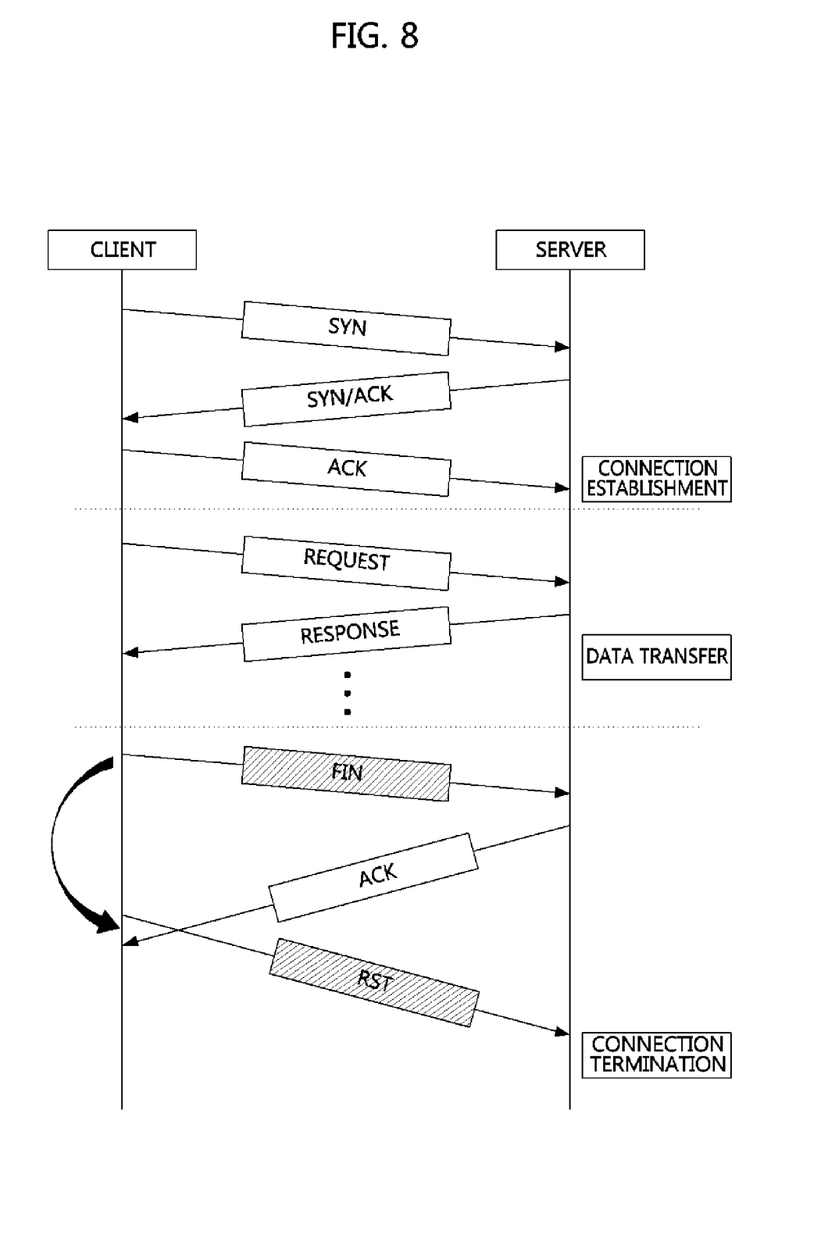
FIG. 8 is a flowchart illustrating a fourth abnormal session termination case that is monitored by the DDoS attack defending method.

FIG. 8 is a flowchart illustrating a fourth abnormally terminated session case that is monitored by the DDoS attack defending method.

Referring to FIG. 8, the fourth abnormally terminated session case corresponds to the case where a TCP session connection between a client and a server is established, data transfer is performed, and the client transmits a FIN packet to the server and then transmits a Reset packet to the server to thereby terminate the session.

Generally, if TCP session connection establishment between a client and a server is complete through TCP 3-Way Handshaking, the client transmits a data request message to the server, and receives a response to the data request message. Thereafter, the client transmits a FIN packet to the server in order to terminate the session, the client receives an ACK message from the server, and then receives a FIN packet or a Reset packet from the server, thereby terminating the session.

However, in the case of a DDoS attack, in order to quickly send an attack packet through transfer of session connection establishment request and data request messages, the client sends a Reset packet just after transmitting a FIN packet. Since it takes, when load is added to the server due to a DDos attack, a long time to receive an ACK packet from the server in response to a FIN packet or to receive a second FIN packet from the server upon Handshaking, the client who is an attacker, transmits a Reset packet just after transmitting a FIN packet in order to more quickly terminate the existing session.

In the DDoS attack described above, the reason for transmitting a FIN packet before transmitting a Reset packet, instead of transmitting a Reset packet to directly terminate the session, is aimed at adding more load to the server. When a server receives a FIN packet from a client, the server transmits an ACK packet in response to the FIN packet, instead of directly terminating the session, transmits, if there is data that is to be transmitted to the client, all the data to the client, and then transmits a FIN packet to the client, thereby terminating the session. However, if the client transmits a Reset packet to the server, the session directly terminates. Accordingly, an attacker transmits a Reset packet after transmitting a FIN packet in order to add more load to the server, thereby quickly returning the attacker's session resource for a next attack. Due to the DDoS attack, since extreme load is applied to the server, the server cannot properly process the Reset packet received from the client, and accordingly, continues to be maintained in the DDoS state.

The DDoS attack using the fourth abnormally terminated session as shown in FIG. 8 may be one of the menus Nos. 7, 8, and 9, "NoCache Get Flood", "CC Attack", and "HTTP Get Nothing", related to Web attacks, among the menus of the Netbot Attacker. That is, after a session connection is established, an HTTP Get Request message is used as a data request message. Also, the results of analysis on the DDoS attack which occurred on Jul. 7, 2009 showed such abnormally terminated session traffic in HTTP Get Flooding.

Hereinafter, a method of tracing the four abnormally terminated session cases as shown in FIGS. 5 through 8 to defend a DDoS attack will be described.

Figure 9:
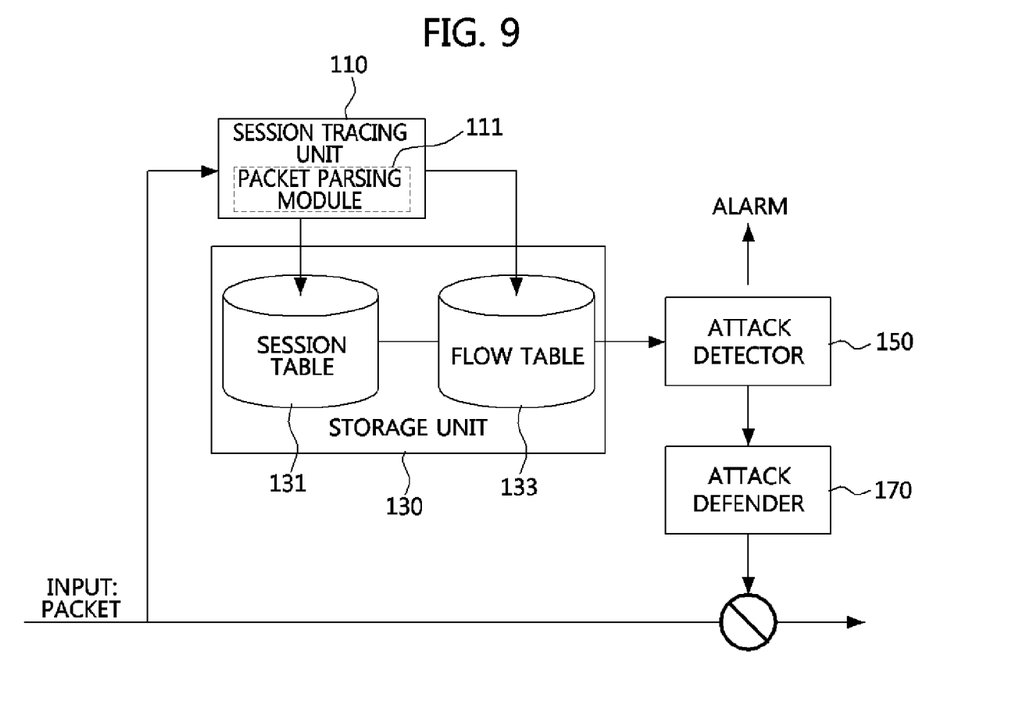
FIG. 9 is a block diagram illustrating a DDoS attack defending apparatus according to an embodiment of the present invention.

FIG. 9 is a block diagram illustrating an apparatus of defending a DDoS attack through abnormally terminated sessions, according to an embodiment of the present invention.

Referring to FIG. 9, the DDoS attack defending apparatus includes a session tracing unit 110, a storage unit 130, an attack detector 150, and an attack defender 170.

The session tracing unit 110 collects packets on a network, and parses the collected packets to extract header information for detecting an attack and responding with it from the collected packets. For this, the session tracing unit 110 may include a packet parsing module 111. The extracted header information includes 5-Tuple information (for example, a protocol, a source IP, a source port, a destination IP, and a destination port) for tracing a session and managing it, and TCP flags information (for example, SYN (Synchronization), ACK (Acknowledgement), FIN (Finish), and RST (Reset)) for tracing state information of the session.

Also, the session tracing unit 110 manages a session table 131 and a flow table 133 using the extracted header information, which will be described later. The session table 131 is used to trace and manage state information of sessions, and the flow table 133 is used to count the number of abnormally terminated sessions with respect to each of the abnormally terminated session cases defined above, in correspondence to the results of tracing state information of the sessions through the session table 131.

The storage unit 130 stores the session table 131 and the flow table 133 that are managed by the session tracing unit 110.

The attack detector 150 compares the number of abnormally terminated sessions with respect to each of the abnormally terminated session cases as shown in FIGS. 5 through 8, to a predetermined threshold value, wherein different predetermined threshold values may be set for the respective abnormally terminated session cases, or a single predetermined threshold value may be set for all the abnormally terminated session cases. Also, according to an embodiment, it is possible that when at least one abnormally terminated session occurs, the abnormally terminated session is detected. However, in order to minimize a false-positive rate of detection of a DDoS attack, the number of abnormally terminated sessions is compared to a predetermined threshold value, and if the number of abnormally terminated sessions exceeds the predetermined threshold value, a DDoS attack is detected in the corresponding flow.

The attack detector 150 generates, when a DDoS attack is detected as described above, attack detection information or an alarm message, and transmits the attack detection information or the alarm message to the corresponding apparatus (for example, a manager's apparatus) according to a predetermined method. Also, the attack detector 150 provides, when a DDoS attack is detected, attack detection information to the attack defender 170, wherein the attack detection information may include information about the corresponding client attempting the DDoS attack.

The attack defender 170 blocks, when it receives the attack detection information from the attack detector 150, all packets transmitted from the corresponding client.

In detail, the attack defender 170 registers 4-Tuple information (for example, a protocol, a source IP, a destination port, and a destination IP) based on the source IP of the corresponding client, included in the attack detection information provided from the attack detector 150, in an Access Control List (ACL), and blocks all packets transmitted from the corresponding client. In the current embodiment, since a flow in which a DDoS attack has been detected is subject to Handshaking between the client and the server, the source IP cannot change. Accordingly, by blocking packets transmitted from the corresponding client based on the source IP, the DDoS attack is defended.

The DDoS attack defending apparatus shown in FIG. 9 is installed in a network terminal and/or a host terminal in order to detect DDoS attacks. Also, the DDoS attack defending apparatus may be softwarily configured in a specific host, or may be implemented as hardware logic using a Field Programmable Gate Array (FPGA).

Figure 10:
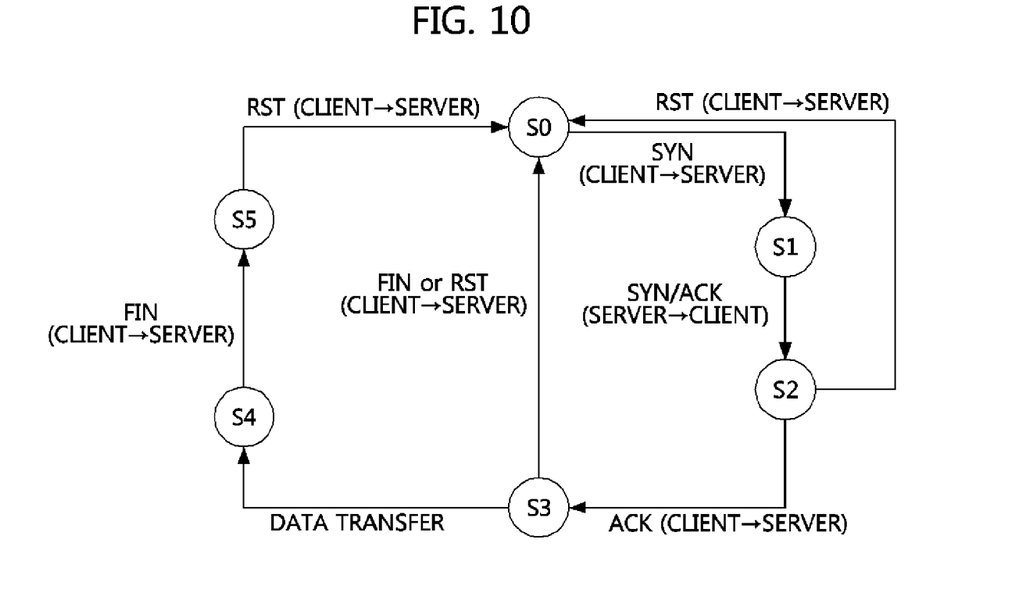
FIG. 10 is a view for explaining a session tracing process for detecting a DDoS attack.

FIG. 10 is a view for explaining a session tracing process for detecting a DDoS attack, and the session tracing process is performed by the session tracing unit 110 shown in FIG. 9.

Referring to FIGS. 9 and 10, the session table 131 is used to trace and manage the state of each session entry based on 5-Tuple information (for example, a protocol, a source IP, a source port, a destination IP, and a destination port).

In detail, the session tracing unit 110 traces session connection establishment, data transfer, and session termination through 3-Way Handshaking. Also, the session tracing unit 110 counts the number of sessions (or flows) with respect to each of abnormally terminated session cases that are monitored by tracing sessions and session state information managed by the method described above, based on 4-Tuple information (for example, a protocol, a source IP, a destination IP, and a destination port), using the flow table 133. The abnormally terminated session cases determined based on the flow table 133 correspond to the four abnormally terminated session cases as described above with reference to FIGS. 5 through 8.

That is, the numbers of abnormally terminated sessions that are managed through the flow table 133 correspond to the following four cases:

Abnormally terminated session Case 1 Count: the number of sessions in which a client transmits a Reset packet to a server to terminate as soon as the client receives a SYN/ACK packet from the server.

Abnormally terminated session Case 2 Count: the number of sessions in which a client transmits a FIN packet to a server without data transfer to terminate after a TCP session connection is established.

Abnormally terminated session Case 3 Count: the number of sessions in which a client transmits a Reset packet to a server to terminate without data transfer after a TCP session connection is established.

Abnormally terminated session Case 4 Count: the number of sessions in which a client transmits a FIN packet to a server and then transmits a Reset packet to the server to terminate after a TCP session connection is established and data is completely transmitted.

Hereinafter, a method of managing the session table 131 and the flow table 133 will be described in more detail with reference to FIG. 10.

Referring to FIGS. 9 and 10, first, if a client transmits a SYNC packet to a server for establishing a TCP session connection, the session tracing unit 110 searches for the corresponding session entry in session entries of the session table 131, and creates, if the corresponding session entry is not found in the session entries of the session table 131, a new session entry and stores it in the session table 131 and the flow table 133, and then changes the corresponding state from "S0" (an initial state) to "S1".

Thereafter, if the server transmits a SYN/ACK packet to the client, the session tracking unit 110 changes the state from "S1" to "S2", and if the client transmits an ACK packet to the server at the final stage of 3-Way Handshaking for establishing a session connection, the session tracking unit 110 changes the state from "S2" to "S3". In the state "S2", if a Reset packet is transmitted from the client to the server, the session tracing unit 110 changes the state from "S2" to "S0", and increases "Abnormally terminated session Case 1 Count" at the corresponding entry of the flow table 133 by 1. The increased "Abnormally terminated session Case 1 Count" value may be stored in the flow table 133 in correspondence to the corresponding 4-Tuple information.

Meanwhile, if a FIN packet or a Reset packet is transmitted from a client to a server directly without data transfer after a session connection is established between the client and the server, the session tracing unit 110 changes the corresponding state from "S3" to "S0". If the packet transmitted from the client to the server is a FIN packet, the session tracing unit 110 increases "Abnormally terminated session Case 2 Count" at the corresponding entry of the flow table 13 by 1. If the packet transmitted from the client to the server is a Reset packet, the session tracing unit 110 increases "Abnormally terminated session Case 3 Count" at the corresponding entry of the flow table 133 by 1. The increased "Abnormally terminated session Case 2 Count" or "Abnormally terminated session Case 3 Count" value may be stored in the flow table 133 in correspondence to the corresponding 4-Tuple information.

Also, if data is transmitted after a session connection between a client and a server is established (that is, in the session state "S3"), the session tracing unit 110 changes the corresponding state from "S3" to "S4", and thereafter, if a FIN packet is transmitted from the client to the server, the session tracing unit 110 changes the state from "S4" to "S5". Thereafter, in the state "S5", if the client transmits a Reset packet to the server, the session tracing unit 110 changes the state from "S5" to "S0", and increases "Abnormally terminated session Case 4 Count" at the corresponding entry of the flow table 133 by 1. The increased "Abnormally terminated session Case 4 Count" value may be stored in the flow table in correspondence to the corresponding 4-Tuple information.

The DDoS attack defending apparatus as shown in FIG. 9 manages the session table 131 and the flow table 133 by tracing session connections and terminations between a client and a server, creates measurement information required to detect a DDoS attack by organically interworking with the session table 131 and the flow table 133, and detects a DDoS attack and responds with it based on the measurement information.

Figure 11:
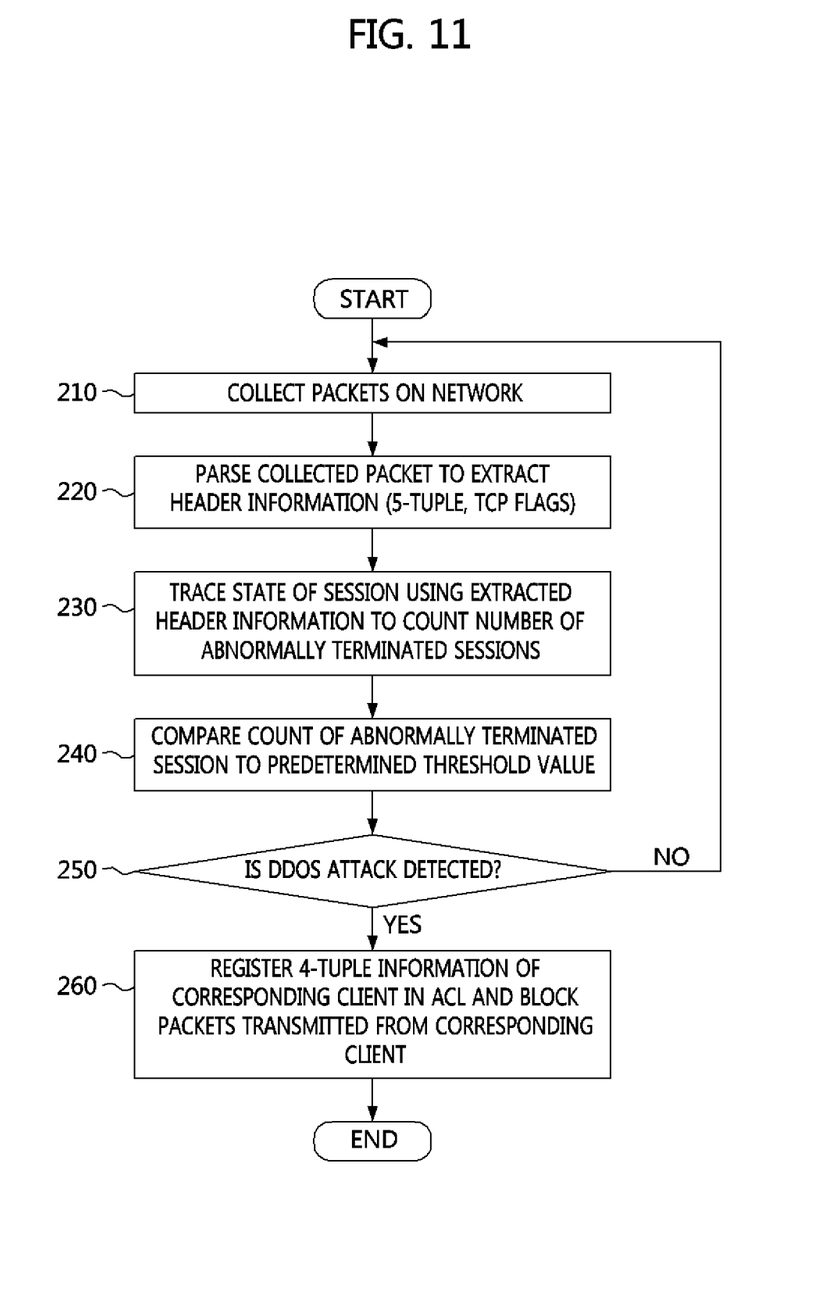
FIG. 11 is a flowchart illustrating a method for defending a DDoS attack through abnormally terminated sessions, according to an embodiment of the present invention.

FIG. 11 is a flowchart illustrating a method for defending a DDoS attack through abnormally terminated sessions, according to an embodiment of the present invention, and the method may be performed by the DDoS attack defending apparatus shown in FIG. 9.

Referring to FIG. 11, the DDoS attack defending apparatus acquires packets transmitted and received on a network (210).

Then, the DDoS attack defending apparatus parses the acquired packets to extract header information from the collected packets (220). Here, the extracted header information includes 5-Tuple information (for example, a protocol, a source IP, a source port, a destination IP, and a destination port) for tracing a session and managing it, and TCP flags information (for example, SYN (Synchronization), ACK (Acknowledgement), FIN (Finish), and RST (Reset)) for tracing state information of the session.

Successively, the DDoS attack defending apparatus traces the states of sessions based on the extracted header information, monitors the four abnormally terminated session cases as defined above, and counts the numbers of abnormally terminated sessions with respect to the four abnormally terminated session cases (230). Here, the DDoS attack defending apparatus determines the state of the corresponding session based on the extracted header information, and manages the determined state of the session through the session table 131 and the flow table 133, thereby using the session table 131 and the flow table 133 as basic information for detecting a DDoS attack.

Thereafter, the DDoS attack defending apparatus compares each of the numbers of abnormally terminated sessions with a predetermined threshold value (240), to detect a DDoS attack according to the results of the comparison (250). If the number of abnormally terminated sessions is greater than the predetermined threshold value, the DDoS attack defending apparatus determines that a DDoS attack has occurred.

Then, if it is determined that a DDoS attack has occurred, the DDoS attack defending apparatus registers 4-Tuple information (for example, a protocol, a source IP, a destination port, a destination IP) based on the source IP of the corresponding client in an ACL to block all packets transmitted from the client.

While the example embodiments of the present invention and their advantages have been described in detail, it should be understood that various changes, substitutions and alterations may be made herein without departing from the scope of the invention.

What is claimed is:

1. A method for defending a Distributed Denial-of-Service (DDoS) attack, the method comprising:
    parsing packets collected during sessions between clients and a server to extract header information from the collected packets;
    tracing a session as an abnormally terminated session when the header information indicates the session corresponds to a pre-defined abnormally terminated session case, the pre-defined abnormally terminated session case including a case where a client transmits a FIN packet to the server and then transmits a Reset packet to the server to terminate a session after a TCP session connection between the client and the server is established and data is completely transmitted between the client and the server;
    counting a number of sessions traced as abnormally terminated sessions;
    comparing the number of sessions traced as abnormally terminated sessions to a predetermined threshold value; and
    determining whether a DDoS attack has occurred based on the comparison.

2. The method of claim 1, wherein parsing packets collected during sessions between the clients and the server to extract header information from the collected packets includes: extracting the header information and TCP flags information from the collected packets, the header information including at least one piece of information about a protocol, a source IP, a source port, a destination IP, and a destination port.

3. The method of claim 1, wherein tracing a session as an abnormally terminated session when the header information indicates the session corresponds to a pre-defined abnormally terminated session case includes tracing states of the sessions by updating a session table that manages state information associated with the sessions; and
    wherein counting a number of sessions traced as abnormally terminated sessions includes storing the number of sessions in a flow table that counts the number of sessions traced as abnormally terminated sessions.

4. The method of claim 1, wherein tracing a session as an abnormally terminated session when the header information indicates the session corresponds to a pre-defined abnormally terminated session case includes tracing a session as a case where a client transmits a Reset packet to the server to terminate a session as soon as the client receives a SYN/ACK packet from the server.

5. The method of claim 1, wherein tracing a session as an abnormally terminated session when the header information indicates the session corresponds to a pre-defined abnormally terminated session case includes tracing a session as a case where a client transmits a FIN packet to the server to terminate a session without data transfer after a TCP session connection between the client and the server is established.

6. The method of claim 1, wherein tracing a session as an abnormally terminated session when the header information indicates the session corresponds to a pre-defined abnormally terminated session case includes tracing a session as a case where a client transmits a Reset packet to the server to terminate a session without data transfer after a TCP session connection between the client and the server is established.

7. The method of claim 1, further comprising:
    registering, when a DDoS attack has occurred, at least one piece of information about a protocol, a source IP, a destination port, and a destination IP of a corresponding client attempting the DDoS attack in an access control list to block packets transmitted from the corresponding client.

8. An apparatus, comprising:

a session tracing unit that:
- collects packets transmitted between a client and a server;
- parses the collected packets to extract header information from the collected packets;
- identifies a session of packets transmitted between the client and the server as an abnormally terminated session when the header information from the collected packets is indicative of an abnormal termination of a session between a client and a server and includes information indicating that the client transmitted a FIN packet to the server and then transmitted a Reset packet to the server to terminate the session after a TCP session connection between the client and the server is established and data is completely transmitted between the client and the server; and
- counts a number of sessions identified as abnormally terminated sessions; and an attack detector that:
- compares the counted number of sessions identified as abnormally terminated sessions to a threshold value of abnormally terminated sessions; and
- generates attack detection information when the counted number of sessions identified as abnormally terminated sessions is greater than the threshold value of abnormally terminated sessions.

9. The apparatus of claim 8, wherein the session tracing unit identifies a session of packets transmitted between the client and the server as an abnormally terminated session by detecting transmission of a packet during the session from the client to the server that is indicative of a Distributed Denial-of-Service (DDoS) attack on the server by the client.

10. The apparatus of claim 8, wherein the session tracing unit identifies a session of packets transmitted between the client and the server as an abnormally terminated session by detecting transmission of a packet during the session from the client to the server that is indicative of abnormal termination of the session.

11. The apparatus of claim 8, wherein the session tracing unit identifies a session of packets transmitted between the client and the server as an abnormally terminated session when the header information from the collected packets indicates that the client transmitted a Reset packet to the server to terminate the session as soon as the client receives a SYN/ACK packet from the server.

12. The apparatus of claim 8, wherein the session tracing unit identifies a session of packets transmitted between the client and the server as an abnormally terminated session when the header information from the collected packets indicates that the client transmitted a FIN packet to the server to terminate the session without data transfer after a TCP session connection between the client and the server was established.

13. The apparatus of claim 8, wherein the session tracing unit identifies a session of packets transmitted between the client and the server as an abnormally terminated session when the header information from the collected packets indicates that the client transmitted a Reset packet to the server to terminate the session without data transfer after a TCP session connection between the client and the server was established.

14. A non-transitory computer-readable storage medium whose contents, when executed by a computing system, cause the computing system to perform operations, comprising:

- collecting packets transmitted between a client and a server;
- parsing the collected packets to extract header information from the collected packets;
- identifying a session of packets transmitted between the client and the server as an abnormally terminated session when the header information from the collected packets is indicative of an abnormal termination of a session between a client and a server, an abnormally terminated session including a session where a client transmits a FIN packet to the server and then transmits a Reset packet to the server to terminate a session after a TCP session connection between the client and the server is established and data is completely transmitted between the client and the server; and
- counting a number of sessions identified as abnormally terminated sessions;
- comparing the counted number of sessions identified as abnormally terminated sessions to a threshold value of abnormally terminated sessions; and
- generating attack detection information when the counted number of sessions identified as abnormally terminated sessions is greater than the threshold value of abnormally terminated sessions.

\* \* \* \* \*